(12) United States Patent
Gourevitch et al.

(10) Patent No.: US 9,589,254 B2
(45) Date of Patent: Mar. 7, 2017

(54) USING E-MAIL MESSAGE CHARACTERISTICS FOR PRIORITIZATION

(75) Inventors: Gregory Gourevitch, Redmond, WA (US); Todd Luttinen, Redmond, WA (US); Victor Boctor, Redmond, WA (US); Wilbert De Graaf, Bellevue, WA (US); Lizhuang Zhao, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 631 days.

(21) Appl. No.: 12/962,697

(22) Filed: Dec. 8, 2010

(65) Prior Publication Data

US 2012/0150964 A1 Jun. 14, 2012

(51) Int. Cl.
| | |
|---|---|
| G06F 15/16 | (2006.01) |
| G06Q 10/10 | (2012.01) |
| H04L 12/835 | (2013.01) |
| H04L 12/927 | (2013.01) |
| H04L 12/70 | (2013.01) |
| H04L 12/54 | (2013.01) |

(52) U.S. Cl.
CPC ........... *G06Q 10/107* (2013.01); *H04L 47/30* (2013.01); *H04L 12/5693* (2013.01); *H04L 47/805* (2013.01); *H04L 2012/5681* (2013.01)

(58) Field of Classification Search
CPC ... H04L 47/30; H04L 47/805; H04L 12/5693; H04L 2012/5681
USPC ................................................. 709/203, 206
See application file for complete search history.

(56) References Cited

U.S. PATENT DOCUMENTS

| | | | |
|---|---|---|---|
| 4,570,227 | A | 2/1986 | Tachi |
| 4,971,434 | A | 11/1990 | Ball |

(Continued)

FOREIGN PATENT DOCUMENTS

| | | |
|---|---|---|
| JP | Hei 04-280535 | 10/1992 |
| JP | Hei 05-233195 | 9/1993 |

(Continued)

OTHER PUBLICATIONS

"XCON: Cannot Configure MTA to Provide Adequate Message Control," Revision: 4.2, Published Date: Oct. 27, 2006, http://support.microsoft.com/kb/186714, pp. 1-3.

(Continued)

*Primary Examiner* — Minh-Chau Nguyen
(74) *Attorney, Agent, or Firm* — Anand Gupta; Tom Wong; Micky Minhas (57) ABSTRACT

Message prioritization may be provided. First, a message may be received and a priority level may be calculated for the message. If the message is not rejected for having a priority lower than a predetermined threshold, the message may be placed in a first priority queue. Next, the message may be de-queued from the first priority queue based upon the calculated priority level for the message. Distribution group recipients corresponding to the message may then be expanded and the priority level for the message may be re-calculated based upon the expanded distribution group recipients. Next, the message may be placed in a second priority queue. The message may then be de-queued from the second priority queue based upon the re-calculated priority level for the message and delivered.

19 Claims, 3 Drawing Sheets

(56) References Cited

U.S. PATENT DOCUMENTS

| | | |
|---|---|---|
| 5,077,668 A | 12/1991 | Doi |
| 5,179,519 A | 1/1993 | Adachi |
| 5,220,507 A | 6/1993 | Kirson |
| 5,377,354 A | 12/1994 | Scannell |
| 5,493,692 A | 2/1996 | Theimer |
| 5,544,321 A | 8/1996 | Theimer |
| 5,555,376 A | 9/1996 | Theimer |
| 5,603,054 A | 2/1997 | Theimer |
| 5,608,635 A | 3/1997 | Tamai |
| 5,611,050 A | 3/1997 | Theimer |
| 5,617,526 A | 4/1997 | Oran |
| 5,634,084 A | 5/1997 | Malsheen |
| 5,671,333 A | 9/1997 | Catlett |
| 5,675,733 A | 10/1997 | Williams |
| 5,694,616 A | 12/1997 | Johnson |
| 5,796,394 A | 8/1998 | Wicks et al. |
| 5,812,865 A | 9/1998 | Theimer |
| 5,826,022 A | 10/1998 | Nielsen |
| 5,826,269 A | 10/1998 | Hussey |
| 5,835,881 A | 11/1998 | Trovato |
| 5,850,219 A | 12/1998 | Kumomura |
| 5,864,848 A | 1/1999 | Horvitz |
| 5,905,863 A | 5/1999 | Knowles |
| 5,907,839 A | 5/1999 | Roth |
| 5,911,773 A | 6/1999 | Mutsuga |
| 5,917,489 A | 6/1999 | Thurlow et al. |
| 5,935,218 A | 8/1999 | Beyda |
| 5,950,187 A | 9/1999 | Tsuda |
| 5,974,465 A | 10/1999 | Wong |
| 5,978,837 A | 11/1999 | Foladare |
| 5,995,597 A | 11/1999 | Woltz |
| 6,021,403 A | 2/2000 | Horvitz |
| 6,034,970 A | 3/2000 | Levac |
| 6,067,565 A | 5/2000 | Horvitz |
| 6,073,142 A | 6/2000 | Geiger et al. |
| 6,078,865 A | 6/2000 | Koyanagi |
| 6,085,216 A | 7/2000 | Huberman |
| 6,101,531 A | 8/2000 | Eggleston |
| 6,119,065 A | 9/2000 | Shimada |
| 6,144,942 A | 11/2000 | Ruckdashel |
| 6,147,977 A | 11/2000 | Thro |
| 6,151,623 A | 11/2000 | Harrison |
| 6,161,130 A | 12/2000 | Horvitz |
| 6,182,059 B1 | 1/2001 | Angotti |
| 6,185,603 B1 | 2/2001 | Henderson |
| 6,189,027 B1 | 2/2001 | Haneda |
| 6,192,360 B1 | 2/2001 | Dumais |
| 6,195,533 B1 | 2/2001 | Tkatch |
| 6,199,102 B1 | 3/2001 | Cobb |
| 6,212,265 B1 | 4/2001 | Duphorne |
| 6,212,535 B1 | 4/2001 | Weikart et al. |
| 6,216,165 B1 | 4/2001 | Woltz |
| 6,233,430 B1 | 5/2001 | Helferich |
| 6,267,733 B1 | 7/2001 | Peterson |
| 6,282,565 B1 | 8/2001 | Shaw |
| 6,298,304 B1 | 10/2001 | Theimer |
| 6,317,592 B1 | 11/2001 | Campana |
| 6,321,158 B1 | 11/2001 | DeLorme |
| 6,327,581 B1 | 12/2001 | Platt |
| 6,339,746 B1 | 1/2002 | Sugiyama |
| 6,353,398 B1 | 3/2002 | Amin |
| 6,363,415 B1 | 3/2002 | Finney et al. |
| 6,370,526 B1 | 4/2002 | Agrawal |
| 6,381,735 B1 | 4/2002 | Hunt |
| 6,385,662 B1 | 5/2002 | Moon et al. |
| 6,396,513 B1 | 5/2002 | Helfman |
| 6,408,277 B1 | 6/2002 | Nelken |
| 6,411,930 B1 | 6/2002 | Burges |
| 6,411,947 B1 | 6/2002 | Rice |
| 6,421,708 B2 | 7/2002 | Bettis |
| 6,421,709 B1 | 7/2002 | McCormick |
| 6,424,995 B1 | 7/2002 | Shuman |
| 6,438,545 B1 | 8/2002 | Beauregard et al. |
| 6,442,589 B1 | 8/2002 | Takahashi |
| 6,466,232 B1 | 10/2002 | Newell |
| 6,477,460 B2 | 11/2002 | Kepler |
| 6,484,197 B1 | 11/2002 | Donohue |
| 6,490,574 B1 | 12/2002 | Bennett |
| 6,505,150 B2 | 1/2003 | Nunberg |
| 6,505,167 B1 | 1/2003 | Horvitz |
| 6,507,866 B1 | 1/2003 | Barchi |
| 6,513,026 B1 | 1/2003 | Horvitz |
| 6,513,046 B1 | 1/2003 | Abbott |
| 6,526,350 B2 | 2/2003 | Sekiyama |
| 6,532,489 B1 | 3/2003 | Merchant |
| 6,549,915 B2 | 4/2003 | Abbott |
| 6,549,944 B1 | 4/2003 | Weinberg |
| 6,553,358 B1 | 4/2003 | Horvitz |
| 6,557,036 B1 | 4/2003 | Kavacheri |
| 6,584,502 B1 | 6/2003 | Natarajan |
| 6,618,716 B1 | 9/2003 | Horvitz |
| 6,622,089 B2 | 9/2003 | Hasegawa |
| 6,622,160 B1 | 9/2003 | Horvitz |
| 6,629,123 B1 | 9/2003 | Hunt |
| 6,654,343 B1 * | 11/2003 | Brandis et al. ............... 370/229 |
| 6,658,485 B1 * | 12/2003 | Baber et al. .................. 719/314 |
| 6,672,506 B2 | 1/2004 | Swartz |
| 6,694,252 B2 | 2/2004 | Ukita |
| 6,714,967 B1 | 3/2004 | Horvitz |
| 6,728,635 B2 | 4/2004 | Sakamoto |
| 6,732,149 B1 | 5/2004 | Kephart |
| 6,741,188 B1 | 5/2004 | Miller |
| 6,747,675 B1 | 6/2004 | Abbott |
| 6,748,225 B1 | 6/2004 | Kepler |
| D494,584 S | 8/2004 | Schlieffers et al. |
| 6,791,580 B1 | 9/2004 | Abbott |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,886,002 B2 | 4/2005 | Horvitz |
| 6,898,518 B2 | 5/2005 | Padmanabhan |
| 6,944,278 B1 | 9/2005 | Nielsen |
| 6,952,647 B2 | 10/2005 | Hasegawa et al. |
| 6,980,993 B2 | 12/2005 | Horvitz et al. |
| 6,999,993 B1 | 2/2006 | Shah et al. |
| 7,003,525 B1 | 2/2006 | Horvitz et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,076,241 B1 | 7/2006 | Zondervan |
| 7,103,473 B2 | 9/2006 | Ranjan |
| 7,120,865 B1 | 10/2006 | Horvitz et al. |
| 7,171,378 B2 | 1/2007 | Petrovich |
| 7,194,681 B1 | 3/2007 | Horvitz |
| 7,195,157 B2 | 3/2007 | Swartz et al. |
| 7,233,933 B2 | 6/2007 | Horvitz et al. |
| 7,233,954 B2 | 6/2007 | Horvitz |
| 7,327,708 B2 * | 2/2008 | Komandur et al. .......... 370/332 |
| 7,337,181 B2 | 2/2008 | Horvitz |
| 7,385,501 B2 | 6/2008 | Miller |
| 7,409,423 B2 | 8/2008 | Horvitz et al. |
| 7,461,129 B2 | 12/2008 | Shah et al. |
| 7,565,403 B2 | 7/2009 | Horvitz et al. |
| 7,664,249 B2 | 2/2010 | Horvitz et al. |
| 7,689,521 B2 | 3/2010 | Nodelman et al. |
| 7,743,340 B2 | 6/2010 | Horvitz et al. |
| 7,797,267 B2 | 9/2010 | Horvitz |
| 7,844,666 B2 | 11/2010 | Horvitz et al. |
| 7,877,686 B2 | 1/2011 | Abbott et al. |
| 7,975,015 B2 | 7/2011 | Horvitz et al. |
| 8,024,415 B2 | 9/2011 | Horvitz et al. |
| 8,166,392 B2 | 4/2012 | Horvitz |
| 8,254,380 B2 * | 8/2012 | Boucard et al. ............... 370/389 |
| 2001/0007968 A1 | 7/2001 | Shimazu |
| 2001/0025223 A1 | 9/2001 | Geiger et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0042087 A1 | 11/2001 | Kephart et al. |
| 2001/0043231 A1 | 11/2001 | Abbott et al. |
| 2001/0043232 A1 | 11/2001 | Abbott et al. |
| 2002/0002450 A1 | 1/2002 | Nunberg et al. |

(56) References Cited

U.S. PATENT DOCUMENTS

| | | |
|---|---|---|
| 2002/0007356 A1 | 1/2002 | Rice et al. |
| 2002/0032689 A1 | 3/2002 | Abbott, III et al. |
| 2002/0038294 A1 | 3/2002 | Matsugu |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054117 A1 | 5/2002 | van Dantzich et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0080888 A1* | 6/2002 | Shu et al. ............... 375/295 |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0087649 A1 | 7/2002 | Horvitz |
| 2002/0099681 A1 | 7/2002 | Gainey et al. |
| 2002/0099817 A1 | 7/2002 | Abbott et al. |
| 2002/0154210 A1 | 10/2002 | Ludwig et al. |
| 2002/0159575 A1 | 10/2002 | Skladman et al. |
| 2002/0164998 A1 | 11/2002 | Younis |
| 2002/0173905 A1 | 11/2002 | Jin |
| 2002/0186823 A1 | 12/2002 | Kikinis et al. |
| 2002/0191034 A1 | 12/2002 | Sowizral et al. |
| 2003/0014491 A1 | 1/2003 | Horvitz et al. |
| 2003/0023571 A1 | 1/2003 | Barnhill |
| 2003/0046401 A1 | 3/2003 | Abbott et al. |
| 2003/0154476 A1 | 8/2003 | Abbott, III et al. |
| 2003/0167311 A1 | 9/2003 | Kirsch |
| 2003/0182052 A1 | 9/2003 | DeLorme et al. |
| 2003/0182383 A1 | 9/2003 | He |
| 2003/0212646 A1 | 11/2003 | Horvitz |
| 2003/0236745 A1* | 12/2003 | Hartsell et al. ............ 705/40 |
| 2004/0015557 A1 | 1/2004 | Horvitz |
| 2004/0070602 A1 | 4/2004 | Kobuya et al. |
| 2004/0172483 A1 | 9/2004 | Horvitz |
| 2004/0201500 A1 | 10/2004 | Miller et al. |
| 2005/0034078 A1 | 2/2005 | Abbott et al. |
| 2005/0065632 A1* | 3/2005 | Douglis ............ H04L 29/06 700/200 |
| 2005/0081059 A1 | 4/2005 | Bandini et al. |
| 2005/0204009 A1* | 9/2005 | Hazarika et al. ............ 709/206 |
| 2005/0266858 A1 | 12/2005 | Miller et al. |
| 2005/0272442 A1 | 12/2005 | Miller et al. |
| 2006/0017983 A1* | 1/2006 | Syri et al. ............... 358/402 |
| 2006/0019676 A1 | 1/2006 | Miller et al. |
| 2006/0031062 A1 | 2/2006 | Bakis et al. |
| 2006/0041583 A1 | 2/2006 | Horvitz |
| 2006/0212220 A1 | 9/2006 | Bou-Ghannam et al. |
| 2006/0271277 A1 | 11/2006 | Hu et al. |
| 2006/0277474 A1 | 12/2006 | Robarts et al. |
| 2007/0011314 A1 | 1/2007 | Horvitz et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2009/0006574 A1 | 1/2009 | Horvitz et al. |
| 2009/0013052 A1 | 1/2009 | Robarts et al. |
| 2009/0094240 A1 | 4/2009 | Bordeaux et al. |
| 2009/0119385 A1 | 5/2009 | Horvitz |
| 2009/0157834 A1* | 6/2009 | Krishnaswamy ............ 709/206 |
| 2009/0259713 A1* | 10/2009 | Blumrich et al. ............ 709/201 |
| 2010/0030865 A1 | 2/2010 | Jiang et al. |
| 2010/0138511 A1* | 6/2010 | Guo et al. ............... 709/207 |
| 2010/0185665 A1* | 7/2010 | Horn .............. G06Q 10/107 707/769 |
| 2010/0217811 A1 | 8/2010 | Kay |
| 2010/0228833 A1 | 9/2010 | Duquette et al. |
| 2011/0071964 A1 | 3/2011 | Horvitz |

FOREIGN PATENT DOCUMENTS

| | | |
|---|---|---|
| JP | Hei 06-120978 | 4/1994 |
| JP | Hei 08-140158 | 5/1996 |
| JP | Hei 08-331621 | 12/1996 |
| JP | Hei 10-079756 | 3/1998 |
| JP | Hei 10-269154 | 10/1998 |
| JP | Hei 10-283291 | 10/1998 |
| JP | Hei 11-017839 | 1/1999 |
| JP | Hei 11-32144 | 2/1999 |
| JP | Hei 11-127259 | 5/1999 |
| WO | WO 98/00787 | 1/1998 |
| WO | WO 98/03907 | 1/1998 |
| WO | WO 98/25195 | 6/1998 |

OTHER PUBLICATIONS

Minh Tran, "FreeBSD server anti-spam software using automated TCP connection control," CAIA Technical Report 040326A, Mar. 2004, http://caia.swin.edu.au/reports/040326A/CAIA-TR-040326A.pdf, pp. 1-13.

"Symantec Brightmail Gateway v8.0," Technical Brief: Messaging Security, Retrieved Date: Sep. 23, 2010, http://eval.symantec.com/mktginfo/enterprise/white_papers/b-brightmai_gateway_8_WP_14552102-2.en-us.pdf, pp. 1-31.

Shin Maruyama et al., "Priority Control in Receiving E-mails by Giving a Separate Response to Each DNS Query," Proceedings of the 2005 Symposium on Applications and the Internet (SAINT'06), IEEE Computer Society, http://ieeexpiore.ieee.org/stamp/stamp.jsp?arnumber=01581317, 4 pgs.

[No Author Listed], "IBM Technical Disclosure Bulletin, Method of rule-based file, window, and message processing", vol. 38, No. 7, Jul. 1, 1995.

[No Author Listed], "Mapmyindia Rocks Indian Web2.0 with GoogleMap Type Digitised Maps," http://www.webyantra.net/tag/mashup/, last accessed Mar. 16, 2007, 7 pages.

[No Author Listed], "PDA Toshiba," http://www.citynotebookcentre.com.au/Products/PDA&CELU/Toshiba/toshiba_pda_e740.htm, last accessed Mar. 16, 2007, 3 pages.

[No Author Listed], "Visual Warbling to subtly indicate status conditions", IBM Technical Disclosure Bulleting, vol. 41, No. 1, 1998, pp. 611-613.

Apte, Chidanand et al., "Automated Learning of Decision Rules for Text Categorization", ACM Transactions on Information Systems (TOIS), 1994, pp. 233-251, vol. 12, Issue 13.

Billinghurst, Mark et al., "An Evaluation of Wearable Information Spaces", Proceedings of the Virtual Reality Annual International Symposium, 1998, 8 pages.

Billinghurst, Mark et al., "Wearable Devices: New Ways to Manage Information", IEEE Computer Society, Jan. 1999, pp. 57-64.

Billinghurst, Mark, "Research Directions in Wearable Computing", University of Washington, May 1998, 48 pages.

Boone, Gary, "Concept Features in Re: Agent, an Intelligent Email Agent", Proceedings of the 2nd International Conference on Autonomous Agents, pp. 141-148, 1998.

Breese, J. et al., "Empirical Analysis of Predictive Algorithms for Collaborative Filtering", In Proceedings of the Fourteenth Conference on Uncertainty in Artificial Intelligence, pp. 43-52, 1998, Auai, Morgan Kaufmann, San Francisco.

Chen, Guanling et al., "A Survey of Context-Aware Mobile Computing Research", Dartmouth Computer Science Technical Report, 2000, 16 pages.

Cohen, W., "Learning Rules that Classify E-Mail", 1996, AAAI Spring Symposium on ML and IR, 1996, accessed at http://www.aaai.org/Papers/Symposia/Spring/1996/Ss-96-05/SS96-05-003.pdf, 8 pages.

Crawford, Elisabeth, et al., "An Intelligent Interface for Sorting Electronic Mail", Proceedings of the 7th International Conference on Intelligent User Interfaces, pp. 182-183, 2002.

Czerwinski, M. et al., "Visualizing implicit queries for information management and retrieval", In Proceedings of CHI '99, ACM SIGCHI Conference on Human Factors in Computing Systems, Pittsburgh, PA, pp. 560-567, 1999, Association for Computing Machinery.

Dumais, Susan, et al., "Inductive Learning Algorithms and Representations for Text Categorization", Proceedings of the 7th Inter- (56) References Cited

OTHER PUBLICATIONS national Conference on Information and Knowledge Management, 1998. pp. 148-155, ACM Press, New York, NY.
Eugenio et al., "Generating driving directions for intelligent vehicles interfaces", 12th IEEE International Conference and Workshops on the Engineering of Computer-Based Systems, 2005, 8 pages.
European Notice of Allowance in Application 00952285.5, mailed Jun. 9, 2006, 11 pgs.
Forscher, Stewart, "CyberNag (Mailmen Division) Project Notebook", accessed at: http://www.cc.gatech.edu/computing/classes/cs3302_96_winter/projects/groups/MailMen/, last accessed on Feb. 9, 2004, 14 pages.
Habel, "Incremental Generation of Multimodal Route Instructions", http://www.cs.niu.edu/-nlgdial/final/SS703CHabel .pdf, last access Dec. 11, 2008, 8 pages, Hamburg Germany.
Hampe et al., "Integrating topographic information and landmarks for mobile navigation", http://www.ikg.uni-hannover.de/publikationen/publikationen/2003/wien_hampe_elias.pdf, last accessed Mar. 14, 2007, 13 pages.
Harter, Andy et al., "A Distributed Location System for the Active Office", IEEE Network, 1994, pp. 62-70.
Heckerman, David, "A Tutorial on Learning With Bayesian Networks", Microsoft Research, Nov. 1996, 57 pages.
Horvitz et al., "Attention-Sensitive Alerting in Computing Systems", Microsoft Research, Aug. 1999.
Horvitz et al., "Attention-Sensitive Alerting", In Proceedings of UAI '99, Conference on Uncertainty and Artificial Intelligence, Sweden Jul. 1999, p. 305-313.
Horvitz, E. et al., "Display of information for time-critical decision making", In Proceedings of the Eleventh Conference on Uncertainty in Artificial Intelligence, pp. 296-305 Montreal, 1995, Canada. Morgan Kaufmann, San Francisco.
Horvitz, E., "Principles of mixed-initiative user interfaces", In Proceedings of CHI '99, ACM SIGCHI Conference on Human Factors in Computing Systems, Pittsburgh, PA, pp. 159-166, 1999, Association for Computing Machinery.
Horvitz, E., et al., "The Lumiere project: Bayesian user modeling for inferring the goals and needs of software users", In Proceedings of the Fourteenth Conference on Uncertainty in Artificial Intelligence, pp. 256-265, 1998, Morgan Kaufman, San Francisco.
Horvitz, E., et al., "Time-critical action: Representations and application", In Proceedings of the Thirteenth Conference on Uncertainty in Artificial Intelligence (UAI-97), pp. 250-257, 1997, Providence, RI, Morgan Kaufmann, San Francisco.
Horvitz, E., et al., "Time-dependent utility and action under uncertainty", In Proceedings of Seventh Conference on Uncertainty in Artificial Intelligence, Los Angeles, CA, pp. 151-158, 1991, Morgan Kaufmann, San Francisco.
Horvitz, Eric et al., "In Pursuit of Effective Handsfree Decision Support: Coupling Bayesian Inference", Speech Understanding, and User Models, 1995, 8 pages.
Japanese Final Rejection in Application 2001-514691, mailed Feb. 5, 2010, 8 pgs.
Japanese Final Rejection in Application 2001-514691, mailed Jun. 11, 2010, 5 pgs.
Japanese Final Rejection in Application 2001-514693, mailed Oct. 7, 2011, 9 pgs.
Japanese Final Rejection in Application 2001-514693, mailed Mar. 4, 2011, 11 pgs.
Japanese Notice of Allowance in Application 2001-514693, mailed Jan. 31, 2012, 6 pgs.
Japanese Notice of Rejection in Application 2001-514693, mailed Oct. 5, 2010, 9 pgs.
Japanese Pre-Appeal Examination in Application 2001-514693, mailed Jul. 29, 2011, 2 pgs.
Japanese Written Appeal in Application 2001-514693, filed Jul. 4, 2011, 6 pgs.
Joachims, Thorsten, "Text Categorized with Support Vector Machines: Learning with Many Relevant Features", 1998, 7 pages.
Koleszar, "A Landmark-Based Location Reference Grid for Street Maps", http://stilnet.dtic.mil/oai/oai? &verb~getRecord &metadataPrefix~htrnl&identifieFADA070048, Defense Technical Information Center, Jun. 1, 1979, 1 page.
Koller, Daphne et al., "Toward Optimal Feature Selection", Proceedings of the 13th Conference on Machine Learning, 1996, pp. 284-292, Morgan Kaufmann, San Francisco, CA.
Leiberman, H., "An agent that assist web browsing", In Proceedings of IJCAI-95, Montreal Canada, 1995, Morgan Kaufmann, San Francisco, 6 pages.
Lewis, David D., "Evaluating and Optimizing Autonomous Text Classification Systems", International ACM-SIGIR Conference on Research and Development in Information Retrieval, 1995, pp. 246-254.
Lewis, David D., et al., "Training Algorithms for Linear Text Classifiers", SIGIR'96, 1996, 9 pages.
Losee, Jr., Robert M., "Minimizing Information Overload: The Ranking of Electronic Messages", Journal of Information Science, 1989, pp. 179-189, vol. 15, Issue 3.
MacSkassy, Sofus A. et al., "EmailValet: Learning Email Preferences for Wireless Platforms", Jun. 3, 1999, 4 pgs.
Maes, Pattie, "Social Interface Agents: Acquiring Competence by Learning from Users and other Agents", AAAI Technical Report Ss-94-03, 1994, pp. 71-78.
Maes, Pattie, et al., "Learning Interface Agents", AAAI-93 Proceedings, 1993, pp. 459-465.
Marx, Matthew et al., "CLUES: Dynamic Personalized Message Filtering", 1996 ACM, 9 pgs.
MacSkassy, Sofus A., et al., "EmailValet: Learning User Preferences for Wireless Email, IJCAI-99 Workshops: Learning About Users and Machine Learning for Information Filtering", pp. 1-6, 1999.
May et al., "Presence and Quality of Navigational Landmarks: Effect on Driver Performance and Implications for Design", http://magpie.lboro.ac.uk/dspace/bitstrearn/2134/2277/1/PUB284.pdf, last accessed Mar. 14, 2007, 40 pages, Loughborough, United Kingdom.
Mock, Kendrick, "An Experimental Framework for Email Categorization and Management", Proceedings of The 24th Annual ACM SIGIR Conference, pp. 392-393, 2001.
PCT International Search Report mailed Sep. 29, 2003, for International Application Serial No. PCT/US00/20685, 7 pgs.
Platt, J., "Fast training of support vector machines using sequential minimal optimization", In Advances in Kernel Methods: Support Vector Learning. MIT Press, 1999, pp. 41-65, MIT Press, Cambridge, MA.
Platt, John C., "Probabilistic Outputs for Support Vector Machines and Comparisons to Regularized Likelihood Methods", Advances in Large Margin Classifiers, 1999 MIT Press, Cambridge, MA, 11 pages.
Provost, Jefferson, "Naive-Bayes vs. Rule-Learning in Classification of Email", pp. 1-4, University of Texas at Austin, Artificial Intelligence Lab. Technical Report, AI-TR-99-284, 1999.
Riecken, Doug et al., "Agents That Reduce Work and Information Overload", p. 31-40; p. 146 (ACM, Communication of the ACM, vol. 37, No. 7, Jul. 1994).
Rhodes, Bradley J., "Remembrance Agent: A continuously running automated information retrieval system", The Proceedings of the First International Conference on the Practical Application of Intelligent Agents and Multi Agent Technology, 1996, pp. 487-495.
Rhodes, Bradley J., "The Wearable Remembrance Agent: A System for Augmented Memory", Personal Technologies Journal Special Issue on Wearable Computing, 1997, 12 pages.
Rhodes, Bradley J., "The Wearable Remembrance Agent: A System for Augmented Theory", The Proceedings of the First International Symposium on Wearable Computers, Oct. 1997, pp. 123-128.
Sahami, M. et al., "A Bayesian approach to filtering junk e-mail", In Workshop on Learning for Text Categorization, AAAI Technical Report WS-98-05, 1998, American Association for Artificial Intelligence, AAAI, 8 pgs.
Schilit, Bill et al., "Context-Aware Computing Applications", in Proceedings of the Workshop on Mobile Computing Systems and Applications, Dec. 1994. pp. 85-90.

(56) References Cited

OTHER PUBLICATIONS

Schilit, Bill et al., "Customizing Mobile Applications", Proceedings USENIX Symposium on Mobile and Location Independent Computing, Aug. 1993, 9 pages.
Schilit, Bill et al., "Disseminating Active Map Information to Mobile Hosts", IEEE Network, 1994, pp. 22-32, vol. 8—No. 5.
Schilit, Bill et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Segal, Richard, et al., "MailCat: An Intelligent Assistant for Organizing Email", Autonomous Agents '99, p. 276-282, 1999, 5 pgs.
Smith, Craig A., "Agent Function for viewpoint-like interfaces", Xerox disclosure journal, vol. 19, No. 6, Nov. 1, 1994, p. 481.
Spreitzer, Mike et al., "Architectural Considerations for Scalable, Secure, Mobile Computing with Location Information", The 14th International Conference on Distributed Computing Systems, Jun. 1994, pp. 29-38.
Spreitzer, Mike et al., "Providing Location Information in a Ubiquitous Computing Environment", SIGOPS '93, 1993, pp. 270-283.
Spreitzer, Mike et al., "Scalable, Secure, Mobile Computing with Location Information", Communications of the ACM, Jul. 1993, 1 page, vol. 36, No. 7.
Starner, Thad Eugene, "Wearable Computing and Contextual Awareness", Massachusetts Institute of Technology, Jun. 1999, 249 pages.
Stenmark, Dick, "The Duality of Email as Corporate Information Channel", Internal Communication, 1999, pp. 1-4.
Theimer, Marvin, et al., "Operating System Issues for PDAs", in Fourth Workshop on Workstation Operating Systems, 1993, 7 pages.
U.S. Appl. No. 09/364,527, Amendment and Response filed Jan. 20, 2004, 12 pgs.
U.S. Appl. No. 09/364,527, Amendment and Response filed May 7, 2003, 13 pgs.
U.S. Appl. No. 09/364,527, Notice of Allowance mailed Jan. 10, 2006, 5 pgs.
U.S. Appl. No. 09/364,527, Notice of Allowance mailed Feb. 19, 2004, 9 pgs.
U.S. Appl. No. 09/364,527, Office Action mailed Dec. 27, 2002, 12 pgs.
U.S. Appl. No. 09/364,527, Office Action mailed Jul. 18, 2003, 7 pgs.
U.S. Appl. No. 09/365,293, Office Action mailed Aug. 23, 2002, 20 pages.
U.S. Appl. No. 09/365,293, Office Action mailed Feb. 5, 2003, 20 pages.
U.S. Appl. No. 09/365,293, Office Action mailed Jun. 26, 2003, 22 pages.
U.S. Appl. No. 09/464,348, Amendment and Response filed Jan. 24, 2003, 9 pgs.
U.S. Appl. No. 09/464,348, Amendment and Response filed Oct. 13, 2003, 9 pgs.
U.S. Appl. No. 09/464,348, Amendment and Response filed Oct. 19, 2004, 9 pgs.
U.S. Appl. No. 09/464,348, Amendment and Response filed Feb. 12, 2003, 9 pgs.
U.S. Appl. No. 09/464,348, Amendment and Response filed Feb. 23, 2005, 14 pgs.
U.S. Appl. No. 09/464,348, Amendment and Response filed Apr. 21, 2004, 9 pgs.
U.S. Appl. No. 09/464,348, Amendment and Response filed Aug. 15, 2005, 10 pgs.
U.S. Appl. No. 09/464,348, Notice of Allowance mailed Nov. 4, 2005, 7 pgs.
U.S. Appl. No. 09/464,348, Office Action mailed Nov. 21, 2003, 9 pgs.
U.S. Appl. No. 09/464,348, Office Action mailed Dec. 15, 2004, 11 pgs.
U.S. Appl. No. 09/464,348, Office Action mailed May 16, 2003, 11 pgs.
U.S. Appl. No. 09/464,348, Office Action mailed May 18, 2005, 13 pgs.
U.S. Appl. No. 09/464,348, Office Action mailed Jul. 20, 2004, 9 pgs.
U.S. Appl. No. 09/464,348, Office Action mailed Sep. 25, 2002, 8 pgs.
U.S. Appl. No. 10/442,546, Amendment after Allowance filed Jan. 25, 2012, 3 pgs.
U.S. Appl. No. 10/442,546, Amendment and Response filed Feb. 24, 2010, 7 pgs.
U.S. Appl. No. 10/442,546, Amendment and Response filed Mar. 23, 2011, 14 pgs.
U.S. Appl. No. 10/442,546, Amendment and Response filed Sep. 2, 2009, 10 pgs.
U.S. Appl. No. 10/442,546, Amendment and Response filed Sep. 20, 2010, 11 pgs.
U.S. Appl. No. 10/442,546, Amendment and Response filed Sep. 6, 2011, 15 pgs.
U.S. Appl. No. 10/442,546, Notice of Allowance mailed Oct. 28, 2011, 14 pgs.
U.S. Appl. No. 10/442,546, Notice of Allowance mailed Feb. 28, 2012, 13 pgs.
U.S. Appl. No. 10/442,546, Office Action mailed Oct. 3, 2008, 36 pgs.
U.S. Appl. No. 10/442,546, Office Action mailed Dec. 23, 2010, 28 pgs.
U.S. Appl. No. 10/442,546, Office Action mailed Jun. 18, 2010, 27 pgs.
U.S. Appl. No. 10/442,546, Office Action mailed Jun. 3, 2011, 17 pgs.
U.S. Appl. No. 10/464,603, Advisory Action mailed Aug. 20, 2004, 3 pgs.
U.S. Appl. No. 10/464,603, Amendment and Response filed Mar. 25, 2004, 10 pgs.
U.S. Appl. No. 10/464,603, Amendment and Response filed Jul. 26, 2004, 8 pgs.
U.S. Appl. No. 10/464,603, Notice of Allowance mailed Dec. 13, 2004, 7 pgs.
U.S. Appl. No. 10/464,603, Office Action mailed Dec. 2, 2003, 12 pgs.
U.S. Appl. No. 10/464,603, Office Action mailed Jun. 14, 2004, 14 pgs.
U.S. Appl. No. 10/795,695, Office Action mailed Jan. 4, 2007, 27 pages.
U.S. Appl. No. 10/795,695, Office Action mailed Jul. 27, 2006, 28 pp.
U.S. Appl. No. 10/795,695, Office Action mailed Jun. 22, 2007, 20 pages.
U.S. Appl. No. 11/314,528, Notice of Allowance mailed Sep. 18, 2008, 10 pgs.
Want, Roy et al., "The Active Badge Location System", ACM Transactions on Information Systems, Jan. 1992, pp. 91-102, vol. 10, No. 1.
Want, Roy, "Active Badges and Personal Interactive Computing Objects", IEEE Transactions on Consumer Electronics, 1992, 11 pages, vol. 38, No. 1.
Weiser, Mark, "Some Computer Science Issues in Ubiquitous Computing", Communications of the ACM, Jul. 1993, pp. 75-84, vol. 36, No. 7.
Weiser, Mark, "The Computer for the 21st Century, Scientific American", Sep. 1991, pp. 94-104, vol. 265, No. 3.
Tomko, "Case Study-Assessing Spatial Distribution of Web Resources for Navigation Services", available at http://www.sli.unimelb.edu.au/tomko/publications/tornko04case.pdf, Jan. 2004, 15 pgs.

* cited by examiner

USING E-MAIL MESSAGE CHARACTERISTICS FOR PRIORITIZATION

BACKGROUND

Within Internet message handling services, electronic mail messages are transferred from one computer to another using a client-server application architecture. When an e-mail server has to deal with bursts of e-mail traffic, it typically utilizes first in first out (FIFO) queuing to process messages in the order they are received. This may cause problems for the e-mail server. For example, a more active sender may cause messages from all other senders to be queued if FIFO were the only mechanism that determines the order and priority of message processing in the e-mail server.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Message prioritization may be provided. First, a message may be received and a priority level may be calculated for the message. If the message is not rejected for having a priority level lower than a predetermined threshold, the message may be placed in a first priority queue. Next, the message may be de-queued from the first priority queue based upon the calculated priority level for the message. Distribution group recipients corresponding to the message may then be expanded and the priority level for the message may be re-calculated based upon the expanded distribution group recipients. Next, the message may be placed in a second priority queue. The message may then be de-queued from the second priority queue based upon the re-calculated priority level for the message and delivered.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

With conventional systems, prioritization of e-mail messages may be performed based on the "X-Priority:" MIME header that communicates a sender's prioritization intent to recipients and/or transmitting e-mail servers. While conventional e-mail servers may choose to honor such headers, in most cases it cannot be used to provide fair e-mail server resource allocation and processing order because: i) e-mail senders are not aware of other messages competing for server resources; and ii) in many cases e-mail senders cannot be trusted and may intentionally try to abuse the system.

When a conventional e-mail server has to deal with bursts of e-mail traffic and cannot immediately process all incoming messages in parallel, it typically utilizes FIFO queuing to process messages in the order they are received. However, in many cases the order of incoming messages does not translate to a fair allocation of e-mail server resources and the order of delivery. An example situation that may result in an unfair allocation may be when a very active sender causes messages from other senders to be queued behind his/her messages and thus consume disproportional amount of resources comparing to the other senders. Similarly, in a multi-tenant e-mail system, an e-mail traffic disparity between different tenants may result in unfair resource allocation between those tenants. Moreover, a larger message may take more resources than other messages or message with a specific type of attachment may be much more expensive to scan for viruses.

Consistent with embodiments of the invention, message priority based on various characteristics of the message may be calculated. Then the calculated priority may be used to determine the order of subsequent processing of the message relative to other messages to achieve a fair resource allocation across different users. The calculated priority may also be used to determine which messages to accept or reject in situations when the queuing capacity is reached.

Embodiments of the invention may use multiple priority queues and are not limited to just two priority queues. With these multiple priority queues, embodiments of the invention may process and re-prioritize a message multiple times before delivery or relay. For example, a message may come in as fresh, but get blocked on a server for a while and become stale. At one point, embodiments of the invention may lower the message's priority after it has gone in a second queue.

Consistent with embodiments of the invention, the number of priority queues, the number of re-prioritization states that take place, and the number of processing states may vary between different embodiments. For example, a message may go through N states of processing with M priority queues between those states and K "priority calculators". The N states of processing may comprise various different types of processing and are not limited to any particular type of processing. While embodiments of the invention are not so limited, one example may be the ability to calculate priority before SMTP response is sent out and making a decision on whether to accept or reject the message based on that priority.

Figure 1:
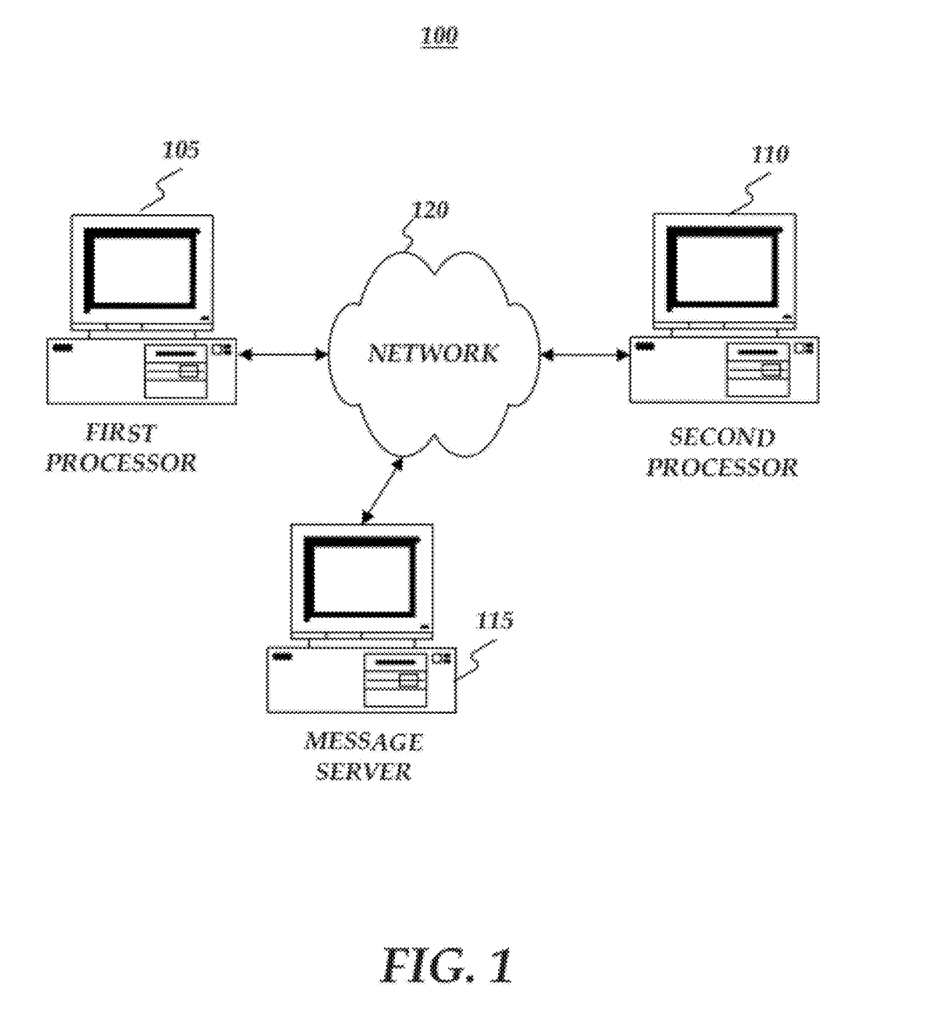
FIG. 1 is a block diagram of an operating environment.

FIG. 1 shows a messaging system 100 consistent with embodiments of the inventions. Messaging system 100 may comprise a first processor 105, a second processor 110, a message server 115, and a network 120. Message server 115 may facilitate the passage of messages (e.g. e-mail) between first processor 105 and second processor 110 over network 120. Any one of first processor 105, second processor 110, and message server 115 may comprise, but is not limited to, a desktop computer, a notebook computer, a mobile device, a smart telephone, or a personal digital assistant, for example. Network 120 may comprise the internet or any type network over which first processor 105, second processor 110, and message server 115 may communicate. Any one of first processor 105, second processor 110, and message server 115 may be implemented using, for example, a computing device 300 as described in greater detail below with respect to FIG. 3.

Message prioritization may be provided. Consistent with embodiments of the invention, a message transfer agent (MTA) may operate on message server 115 to facilitate the passage of messages (e.g. e-mail) between first processor 105 and second processor 110 over network 120. The MTA may calculate priority of a message based on various message characteristics such as sender, recipients, authentication level, message size, etc. The calculated priority may then be used by the MTA to prioritize further processing and delivery/relay of the message relative to other messages in the MTA's pipeline. The calculated priority can also be used as a reason to temporarily reject a given message, which may allow the MTA to allocate more resources to processing higher priority messages.

Consistent with embodiments of the invention, message priority may be calculated based on various message characteristics. The calculated message priority may then be used to determine the order (e.g. priority) of further processing and relay/delivery of the message. The calculated priority may also be used to decide whether to accept or reject the message. Embodiments of the invention may also include an extensibility model to allow custom classification algorithms to determine priorities. Moreover, embodiments of the invention may include a classification system that may be layered on top of priority queuing and health-based throttling (e.g. backpressure), where one layer can be changed independent of the others.

Figure 2:
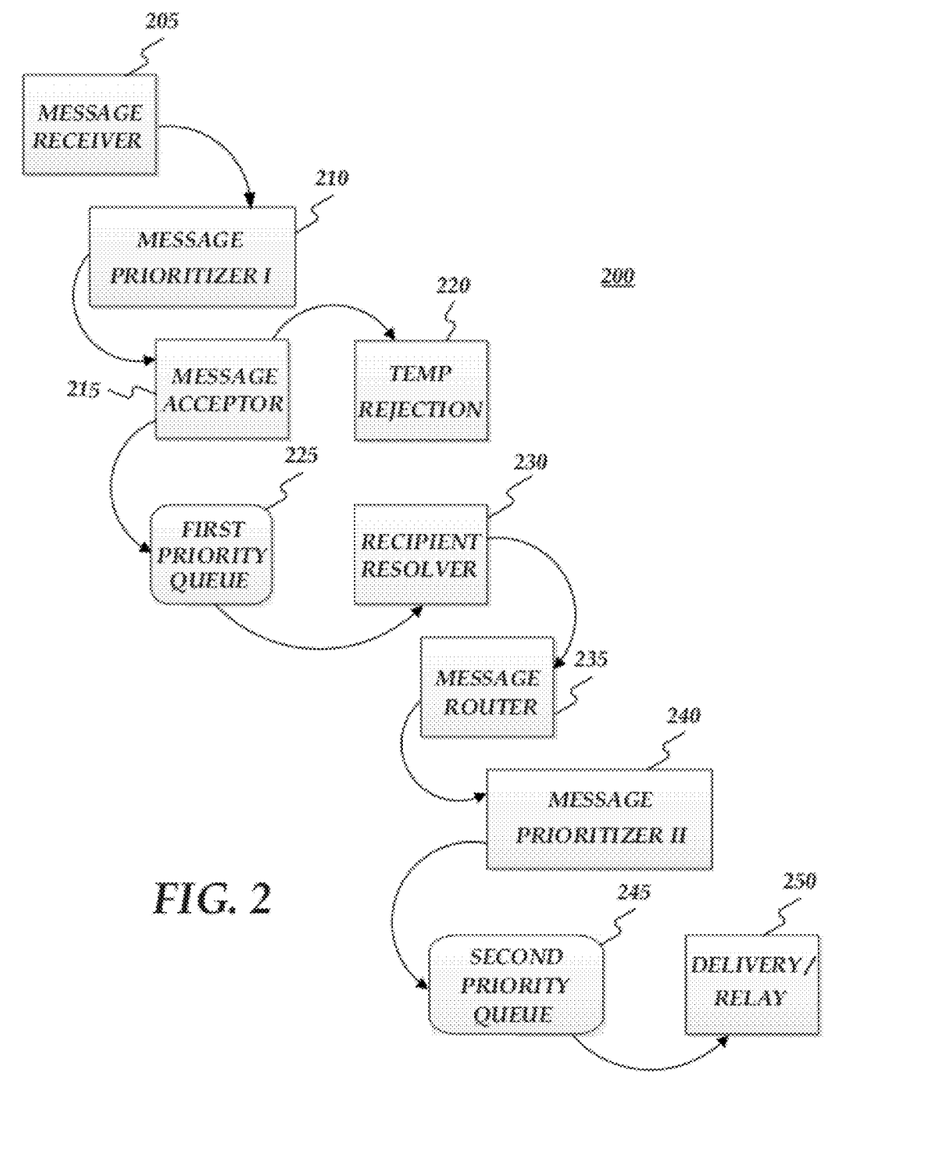
FIG. 2 is a state diagram of a method for providing prioritization.

FIG. 2 is a state diagram setting forth the general stages involved in a method 200 consistent with an embodiment of the invention for providing prioritization. Method 200 may be implemented using message server 115. A computing device 300, as described in more detail below with respect to FIG. 3, may be used as an operating environment for message server 115. Ways to implement the states of method 300 will be described in greater detail below.

As shown in FIG. 2, message server 115 may receive a message. (State 205.) The message may comprise an e-mail and may be received, for example, from first processor 105, second processor 110, or another e-mail server. For example, a user using a first e-mail client running on first processor 105 may wish to send the message to another user using a second e-mail client running on second processor 110. In order to achieve this, first processor 105 may send the message to message server 115 that may act as a message server for second processor 110.

After the message is received (state 205), message server 115 may calculate a priority level for the received message based on the received message's characteristics. (State 210.) The priority level for the received message may comprise any index by which messages may be proved with a priority level. For example, the message may be designated with a "high", medium", or "low" priority level. The message may be given an index between 1 and 10 or between "A" and "Z". Notwithstanding, a priority level may be calculated and assigned to the received message. The calculated priority level may indicate the received message's priority.

The message's characteristics from which the priority level may be calculated may comprise, but are not limited to, direct characteristics and aggregated characteristics. Direct characteristics may comprise, but are not limited to, the message's size, the presence of a specific attachment type to the message, an authentication level of the message's sender, a number of recipients the message has, whether one of the recipients the message has is a distribution group, whether the message is "fresh" verses "delayed", or whether the message is being aggregated from a secondary account verses a regular message. Regarding the message's size direct characteristic, where the message is larger than a configurable threshold, the message may be assigned a lower priority. Regarding the message's "fresh" verses "delayed" direct characteristics, if the message was sent over a time period (e.g. 30 min.) ago, it may be marked as low priority. Another direct characteristic may comprise whether the message is associated with a user (e.g. sender and/or receiver) who is paying for the e-mail service or is receiving the e-mail service for free.

Aggregated characteristics may comprise, for example, a sender threshold. The sender threshold may comprise, but is not limited to, a number of recipients, a number of messages sent, and a total size of messages sent, for example. In this case, when a specific sender reaches a threshold on the number of messages submitted to message server 115 over a time period (e.g. the last minute), all other messages from the sender may be assigned a lower priority until the sender becomes inactive for some period of time. Other examples of the aggregated characteristics may comprise: i) tenant organization activity in a given time interval in a multi-tenant e-mail system; ii) aggregated usage of a specific resource by a sender/tenant; and iii) number of messages recently delivered to recipients of the message. A tenant organization activity may comprise an e-mail service for multiple organizations is hosted in a cloud. In this situation, the same set of hardware and other resources may be shared between those organizations.

Once the priority of a message has been determined, it can be used by message server 115 in states of method 200 in cases when message server 115 may not have enough resources to process all messages in parallel. Such subsequent states may comprise, but not limited to, distribution group expansion (e.g. state 230), rules and policy enforcement, delivery to mailboxes, or relay to other servers. The resource allocation across different messages may be based on the accuracy of priority calculation in addition to the order the messages may have been received by message server 115.

Once the priority for the received message is calculated (state 210), message server 115 may decide whether to accept or temporarily reject the message. (State 215.) The decision whether to accept or temporarily reject the message may be based on the calculated priority and the current queuing capacity/resource usage. For example, message server 115 may calculate the message priority before the message is fully accepted from first processor 105. In this case message server 115 may make a decision on whether to accept the message based on the priority. When SMTP protocol is used for message transmission, such priority calculation may be done any time before message server 115 sends a response to the SMTP DATA command (or the last chunk of ESMTP BDAT command for example). This approach may be used when message server 115 has utilized certain percentages of its queuing capacity. For example, message server 115 may start temporarily rejecting (e.g. 4XX SMTP response code) (state 220) Low priority messages when it uses over 60% of its queuing capacity and start temporarily rejecting (state 220) Normal priority messages when it reaches 80% of its queuing capacity. If message server 115 accepts (and does not temporarily reject) the message, the message may be accepted and placed on a first priority queue. (State 225.) If the calculated priority level is too low, message server 115 may decide to not accept the message from the sending MTA/client (e.g. that is, reject the message). It may then be up to the sending MTA/client to handle, for example, the SMTP protocol reject and depending on the error code, provide a temporary hold and/or other alternatives.

After the message is placed on the first priority queue (state 225), message server 115 may de-queue the message from the first priority queue. The order by which message server 115 de-queues the message may be priority-aware and may not be strictly FIFO. For example, all the messages in the first priority queue may be assigned a priority level based upon based on the messages' characteristics. (State 210.) Message server 115 may de-queue the messages with a higher priority level before it de-queue the messages with a lower priority level. Within messages having the same priority level, FIFO may be applied.

Once dequeued, message server 115 may process the message by expanding any distribution group recipients the message may have. (State 230.) After the message is processed (state 230), message server 115 may determine message destinations for delivery/relay based, for example, on recipient addresses. (State 235.) Next, message server 115 may re-calculate the priority based, for example, on the recipient changes made when message server 115 expanded (state 230) any distribution group recipients. (State 240.) The priority may be re-calculated multiple times as the message is transformed by different states in message server 115. For example, a distribution group expansion may increase the number of recipients of the message. The number of recipients may be a characteristic that affects prioritization. Consequently, the message's priority may be recalculated after the distribution group expansion in state 230. This group expansion may be one example of what can affect the priority of messages in-flight and embodiments of the invention are not so limited.

Once message server 115 re-calculates the priority (state 240), message server 115 may place the message on a second priority queue for delivery/relay. (State 245.) This is another place where the order of further processing may be influenced by the priority and is not strictly FIFO.

After message server 115 places the message on the second priority queue (state 245), message server 115 may de-queue the message from the second priority queue. As described above, the order of de-queuing may be priority-aware and may not be strictly FIFO. Once de-queued, the message may be delivered/relayed to its destinations. (State 250.)

An embodiment consistent with the invention may comprise a system for providing prioritization. The system may comprise a memory storage and a processing unit coupled to the memory storage. The processing unit may be operative to receive a message, calculate a priority level for the message, and place the message in a first priority queue. Moreover, the processing unit may be operative to de-queue the message from the first priority queue based upon the calculated priority level for the message and expand distribution group recipients corresponding to the message. Furthermore, the processing unit may be operative to re-calculate the priority level for the message based upon the expanded distribution group recipients and place the message in a second priority queue. In addition, the processing unit may be operative to de-queue the message from the second priority queue based upon the re-calculated priority level for the message and deliver the message.

Another embodiment consistent with the invention may comprise a system for providing prioritization. The system may comprise a memory storage and a processing unit coupled to the memory storage. The processing unit may be operative to calculate a priority level for a message. The calculated priority level for the message may be based upon at least one of the following: direct characteristics of the message and aggregated characteristics of the message. Furthermore, the processing unit may be operative to place the message in a priority queue. In addition, the processing unit may be operative to de-queue the message from the priority queue based upon the calculated priority level for the message and deliver the message.

Yet another embodiment consistent with the invention may comprise a system for providing prioritization. The system may comprise a memory storage and a processing unit coupled to the memory storage. The processing unit may be operative to calculate a priority level for a message. The calculated priority level for the message may be based upon at least one direct characteristic of the message or at least one direct aggregated characteristic of the message. Moreover, the processing unit may be operative to place the message in a first priority queue and to de-queue the message from the first priority queue based upon the calculated priority level for the message. Furthermore, the processing unit may be operative to expand distribution group recipients corresponding to the message and to re-calculate the priority level for the message based upon the expanded distribution group recipients. In addition, the processing unit may be operative to place the message in a second priority queue, de-queue the message from the second priority queue based upon the re-calculated priority level for the message, and to deliver the message.

Figure 3:
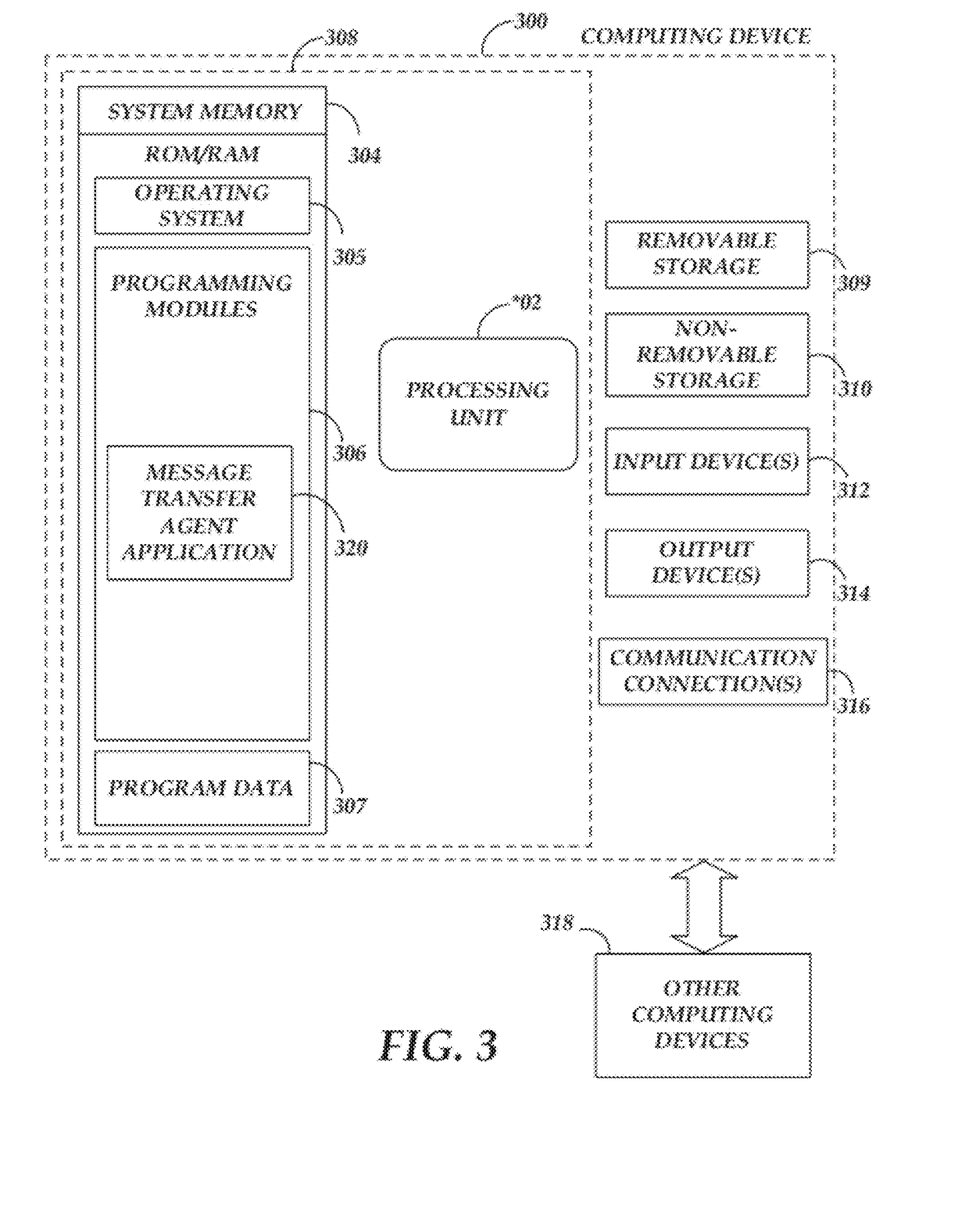
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for message server 115 as described above. Message server 115 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g.

read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include, for example, a message transfer agent application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g. message transfer agent application 320) may perform processes including, for example, one or more method 200's stages (i.e. states) as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing prioritization, the method comprising:
   receiving a message;
   determining, upon receipt of the message, a current occupancy of a first priority queue;
   determining a first occupancy threshold associated with the first priority queue;
   placing the message in the first priority queue based on a comparison of the determined current occupancy and the first occupancy threshold;
     calculating a priority level for the message, wherein calculating the priority level for the message comprises calculating the priority based on direct characteristics of the message and aggregated characteristics associated with a sender of the message, the aggregated characteristics associated with the sender comprising a sender threshold;
     de-queuing the message from the first priority queue based upon the calculated priority level for the message;
   placing the message in a second priority queue;
   expanding distribution group recipients corresponding to the message, wherein the distribution group recipients is a group of recipients to which the message is intended to be delivered;
   re-calculating the priority level for the message based upon the expanded distribution group recipients;
   de-queuing the message from the second priority queue based upon the re-calculated priority level for the message; and
   delivering the message.

2. The method of claim 1, wherein receiving the message comprises receiving the message from an e-mail client.

3. The method of claim 1, wherein receiving the message comprises receiving the message from a message server.

4. The method of claim 1, wherein calculating the priority level for the message based on the direct characteristics comprises calculating the priority level based upon a size of the message.

5. The method of claim 1, wherein calculating the priority level for the message based on the direct characteristics comprises calculating the priority level based upon a presence of a specific attachment type to the message.

6. The method of claim 1, wherein calculating the priority level for the message based on the direct characteristics comprises calculating the priority level based upon an authentication level of a sender of the message.

7. The method of claim 1, wherein calculating the priority level for the message based on the direct characteristics comprises calculating the priority level based upon a number of recipients the message has.

8. The method of claim 1, wherein calculating the priority level for the message based on the direct characteristics comprises calculating the priority level based upon a recipient the message within the distribution group.

9. The method of claim 1, wherein calculating the priority level for the message based on the direct characteristics comprises calculating the priority level based upon whether the message is "fresh" verses "delayed".

10. The method of claim 1, wherein calculating the priority level for the message based on the direct characteristics comprises calculating the priority level based upon whether the message is being aggregated from a secondary account verses a regular message.

11. The method of claim 1, wherein calculating the priority level for the message based on the aggregated characteristics comprises calculating the priority level based one of the following: a number of recipients, a number of messages sent, and a total size of messages sent.

12. The method of claim 1, wherein calculating the priority level for the message based on the aggregated characteristics comprises calculating the priority level based upon tenant organization activity in a given time interval in a multi-tenant e-mail system.

13. The method of claim 1, wherein calculating the priority level for the message based on the aggregated characteristics comprises calculating the priority level based upon aggregated usage of a specific resource by a sender/tenant.

14. The method of claim 1, wherein delivering the message comprises delivering the message to a recipient e-mail box.

15. The method of claim 1, wherein calculating the priority level for the message based on the aggregated characteristics comprises calculating the priority level based upon whether the message is being one of sent to and send from a user who is paying for e-mail service verses receiving the e-mail service for free.

16. The method of claim 1, wherein placing the message in the first priority queue based on the comparison of the determined current occupancy and the first occupancy threshold comprises:

determining whether the current occupancy of the first priority queue is more than the first occupancy threshold;

determining, in response to determining that the current occupancy is more than the first occupancy threshold for the first priority queue, whether the priority of the message is lower than a first predetermined priority level for the determined first occupancy threshold; and placing, in response to determining that the priority of the message is not lower than the first predetermined priority level for the first threshold, in the first priority queue.

17. The method of claim 1, further comprising:

determining a second occupancy threshold associated with the first priority queue;

determining whether the current occupancy of the first priority queue is more than the second occupancy threshold;

determining, in response to determining that the current occupancy is more than the second occupancy threshold for the first queue, whether the priority of the message is lower than a second predetermined priority level for the second occupancy threshold; and placing, in response to determining that the priority of the message is not lower than the second predetermined priority level for the second occupancy threshold, in the first priority queue.

18. A system for providing prioritization, the system comprising:

a memory storage; and a processing unit coupled to the memory storage, wherein the processing unit is operative to:

determine, upon receipt of a message, a current occupancy of a first priority queue;

determine a first occupancy threshold associated with the first priority queue;

place the message in the first priority queue based on a comparison of the determined current occupancy and the first occupancy threshold;

calculate a priority level for the message, the calculated priority level for the message being based upon at least one of the following:

at least one direct characteristic of the message and at least one aggregated characteristic of the message, wherein the at least one aggregated characteristic of the message comprises characteristics associated with a sender of the message comprising a sender threshold;

de-queue the message from the first priority queue based upon the calculated priority level for the message;

place the message in a second priority queue;

expand distribution group recipients corresponding to the message into a plurality of recipients within the distribution group, wherein the distribution group recipients is a group of recipients to which the message is intended to be delivered;

re-calculate the priority level for the message based upon the expanded distribution group recipients;

de-queue the message from the second priority queue based upon the re-calculated priority level for the message; and deliver the message.

19. A computer readable storage device storing instructions, the instructions, when executed, performing a method, the method comprising:

determining, upon receipt of the message, a current occupancy of a first priority queue;

determining a first occupancy threshold associated with the first priority queue;

placing the message in the first priority queue based on a comparison of the determined current occupancy and the first occupancy threshold;

calculating a priority level for the message, wherein calculating the priority level for the message comprises calculating the priority based on direct characteristics of the message and aggregated characteristics associated with a sender of the message, the aggregated characteristics associated with the sender comprising a sender threshold;

de-queuing the message from the first priority queue based upon the calculated priority level for the message;

placing the message in a second priority queue;

expanding distribution group recipients corresponding to the message, wherein the distribution group recipients is a group of recipients to which the message is intended to be delivered;

re-calculating the priority level for the message based upon the expanded distribution group recipients;

de-queuing the message from the second priority queue based upon the re-calculated priority level for the message; and delivering the message.

* * * * *